United States Patent [19]

Lisimaque et al.

[11] Patent Number: 4,813,024
[45] Date of Patent: Mar. 14, 1989

[54] INTEGRATED CIRCUIT FOR THE CONFIDENTIAL STORAGE AND PROCESSING OF DATA, COMPRISING A DEVICE AGAINST FRAUDULENT USE

[75] Inventors: Gilles Lisimaque; Serge Fruhauf, both of Peynier, France

[73] Assignee: Thomson Composants Militaires Et Spaciaux, Paris, France

[21] Appl. No.: 62,078

[22] Filed: Jun. 10, 1987

[30] Foreign Application Priority Data

Jun. 13, 1986 [FR] France .................. 86 08589

[51] Int. Cl.$^4$ .............................................. G11C 13/00
[52] U.S. Cl. .................... 365/228; 365/206; 365/207; 371/21; 371/67
[58] Field of Search ............... 365/185, 189, 190, 191, 365/195, 206, 207, 228; 371/20, 21, 67

[56] References Cited

U.S. PATENT DOCUMENTS 4,211,919 7/1980 Ugon .
4,295,041 10/1981 Ugon .

FOREIGN PATENT DOCUMENTS 2311360 5/1975 France .

Primary Examiner—Terrell W. Fears
Attorney, Agent, or Firm—Oblon, Fisher, Spivak, McClelland & Maier

[57] ABSTRACT

A fraud-preventive device for a memory card comprising an EPROM type or similar non-volatile memory designed to receive confidential authorization data as well as the results, wrong or otherwise, of tests on the authorization data, comprises a single simulation cell designed to record the non-erroneous results, this cell consuming the same current as a memory cell, which has never been programmed, of the memory part designed to record the wrong data.

3 Claims, 2 Drawing Sheets

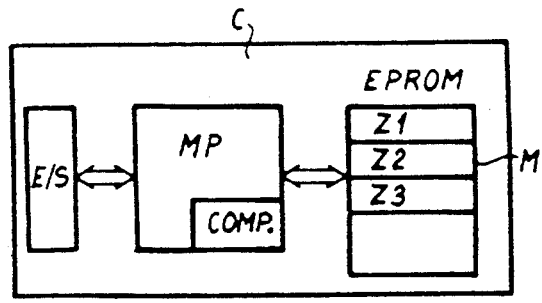
FIG_1
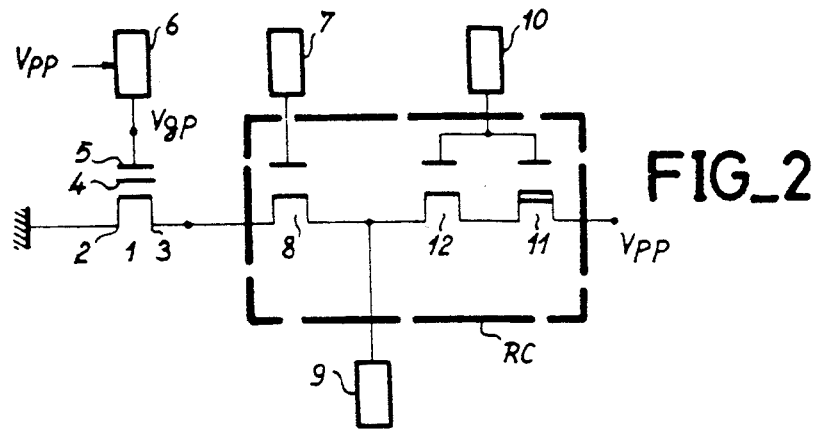
FIG_2
FIG_5
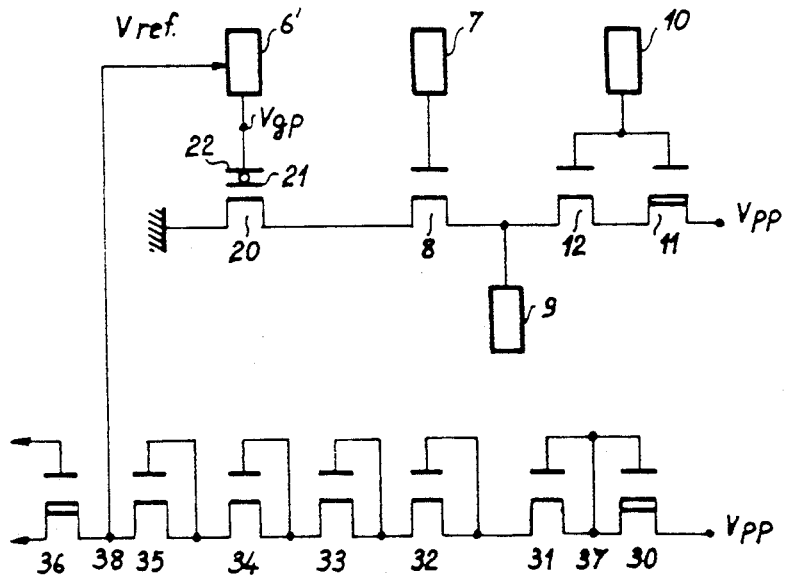

FIG_3-A
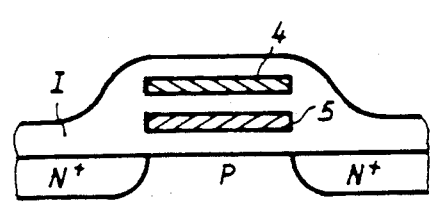
FIG_4-A
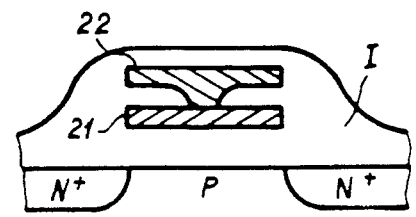
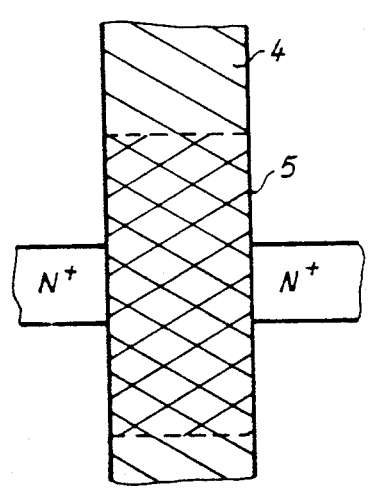
FIG_3-B
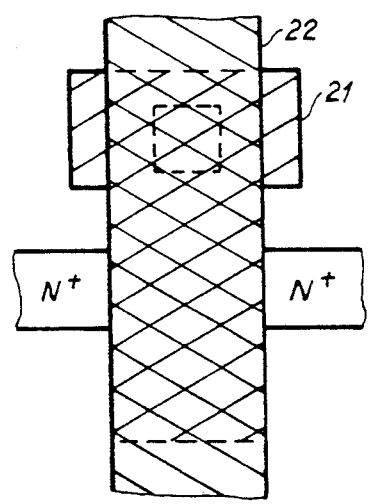
FIG_4-B

INTEGRATED CIRCUIT FOR THE CONFIDENTIAL STORAGE AND PROCESSING OF DATA, COMPRISING A DEVICE AGAINST FRAUDULENT USE

BACKGROUND OF THE INVENTION

1. Field of the Invention

The object of the present invention is an integrated circuit for the confidential storage and processing of data, comprising a device against fraudulent use. It pertains, more especially but not exclusively, to the integrated circuits of the above type, called memory cards.

2. Description of the Prior Art

Memory cards are made with an electronic integrated circuit comprising essentially an electrically programmable non-volatile memory often comprising non-modifiable confidential data, input/output means used to couple the circuit with a data-transfer device and processing means interconnected between the input/output means and the memory. In certain memory card applications, access to certain zones of the non-volatile memory must imperatively be protected by an access key such as a confidential code associated with certain reading or writing rights in these specific zones. There are many devices used to dissuade fraudulent persons who might try to discover the secret code or the key that gives access to a memory by conducting successive tests. The best known of these devices is probably the one which permanently memorizes the wrong keys and blocks the operation as soon as the number of errors exceeds a pre-determined value. However, this device is inefficient if used by itself. For, when a memory cell is programmed at "1", there is a variation in the current and, by observing the variation of the write current in the memory, it is possible to determine, with precision, that the right key has been entered, provided that this current is correctly limited so that no errors can be recorded. To remove this disadvantage, the current method used is to program a datum in all cases thus causing current to be consumed. In this case, a fraudulent person cannot distinguish beteen correct attemts and incorrect ones by measuring the external current consumed by the component. The fraudulent person, thus cannot be informed of the results of his action. This operation, although efficient, has a serious disadvantage. It requires a relatively large memory space to record correct attempts which, in fact, are the most frequent ones. Now, in the case of a non-volatile memory of the EPROM or similar type, it will not be possible to re-use this space. Furthermore, it is not necessary to keep a record of correct attempts which are not subsequently used, unlike wrong attempts which must be used to block the system.

To remove this disadvantage, the specialist might think of programming only one and the same non-volatile memory cell if a datum presented is correct and of programing different cells only when the information presented is incorrect. This provides for a substantial increase in memory capacity. However, a memory cell which has already been programmed has a power consumption curve which is different than that of a virgin memory cell. For a virgin memory cell with a non-volatile memory has a current consumption peak of about 2% at the start of the programming, and this peak is virtually re-absorbed after 2 milliseconds. Now this consumption peak no longer exists when the cell is reprogrammed. It is therefore possible for a fraudulent person to detect the passage of a right key.

The present invention, therefore, is aimed at removing this disadvantage while at the same time using only one point to program correct attempts.

SUMMARY OF THE INVENTION

Consequently, the object of the present invention is an integrated circuit for the confidential storage and processing of data, an integrated circuit comprising at least:

One electrically programmable non-volatile memory containing, among others, authorization data, Input/output means used to couple the circuit to a data transferring device, Processing means connected between the input/output means and the non-volatile memory, the said processing means comprising, among other elements, an identifying comparator designed to compare the authorization data with a confidential code or access key introduced by means of the input/output means, the identifying comparator being associated with means to memorize, in a first non-volatile memory zone, an error bit and in a second non-volatile memory zone, an access bit, depending on whether the code introduced is wrong or not, wherein the second memory zone is made up of a single cell, called a simulation cell which, when activated, consumes the same current as a memory cell, which has never been programmed, of the first memory zone.

With the above system, a fraudulent person can no longer get information about the results of his actions because, whatever the results recorded in the first memory zone or simulated on the cell, the same current consumption is observed.

In the definition of the present invention, the following points will be specified for the specialists:

The term "data processing" refers either to the simple transfer of data between the integrated circuit and an external system or to the transfer and execution of a certain number of operations within the circuit itself.

The term "comparator" refers not only to a simple comparator that compares the authorization data with the confidential code or the access key, but also to any system which, on the basis of authorization data or the confidential code or access key, performs a number of operations in order to authorize the continuation of operations.

The term "processing means" refers to all the circuits needed to write and read data in the memory as well as to the processing of this data. In general, the processing means consist of a microprocessor provided with its auxHlary circuits means which are well known to the specialist.

According to a preferred embodiment of the present invention, when the first memory zone is formed by a non-volatile memory, the memory cells of which are formed by floating gate transistors, the simulation cell consists of a floating gate transistor, the floating gate of which is short-circuited with the control gate and presents the same gate-source voltage as a memory cell of the first memory zone. The same gate/source voltage can be obtained by applying a write control voltage to the control gate of the simulation cell; this write control voltage being equal to $\gamma$ x the write control voltage applied to the memory cells of the first memory zone, $\gamma$ being the coupling coefficient of a floating gate transistor. In fact, the cell according to the present invention is not a memory cell for it records no bits: rather, it is a cell simulating a programming operation at the level of the current, which is why it is called a simulation cell.

BRIEF DESCRIPTION OF THE DRAWINGS

Other characteristics and advantages of the present invention will emerge from the following description of an embodiment, made with reference to the appended drawings of which:

FIG. 1 is a block diagram of the various parts of an integrated circuit to which the present invention is applicable, FIG. 2 is a diagram of an embodiment of a memory cell of the first memory zone connected to its control circuits, FIGS. 3A and 3B respectively show a cross-section view and a plane view from the top of the memory cell of FIG. 2, FIGS. 4A and 4B respectively show a cross-section view and a plane view from the top of an embodiment of a simulation cell according to the present invention, and FIG. 5 is a diagram of the simulation cell of FIGS. 4A and 4B connected to control circuits. To simplify the description, the same elements bear the same references in the figures. cl DESCRIPTION OF THE PREFERRED EMBODIMENT FIG. 1 shows, by way of example, a memory card C in the form of an integrated circuit using the present invention. It is clear to the specialist that other integrated circuits can be considered for the application of the present invention.

The memory card C, depicted in FIG. 1, comprises essentially an electrically programmable non-volatile memory M, for example, an EPROM memory, an input/output device E/S used to couple the said card to a device for the external transfer of data and a microprocessor MP connected between the input/output E/S and the said memory M. To enable the confidential processing of certain data, the memory card contains authorization data. This auhtorization data is generally programmed in a zone Z1 of the EPROM memory. Furthermore, for this confidential processing operation, the autorization data contained in the zone Z1 should generally be compared with an access key or a confidential code entered from the outside by means of the input/output device E/S. Consequently, the microprocessor MP comprises comparing means, called an identification comparator COMP, designed to compare the authorization data contained in the zone Z1 with the confidential code or access key introduced by means of the device E/S. According to an embodiment of the prior art, this identification comparator COMP is associated with means to memorize an error bit in the first non-volatile memory zone when the access key is wrong. This first memory zone consists, in the embodiment shown, of a zone Z2 of the EPROM Memory. Furthermore, when the code introduced is not wrong, the identifying comparator sends the access bit to a second memory zone which is formed by the zone Z3 of the EPROM memory M.

As mentioned in the introduction, the memorizing of all the non-erroneous tests in the memory zone Z3 consumes a great deal of memory space. Thus, according to the present invention, the memory zone Z3 can be limited to a single cell, called a simulation cell which, when activated, consumes the same current as a memory cell of the first memory zone which has never been programmed.

In the case of electrically programmable non-volatile memories of the EPROM type, wherein the memory cell consists of a floating gate transistor, the simulation cell according to the present invention will consist of a floating gate transistor, the floating gate of which is connected to the control gate. From a technological point of view, this simulation cell can be made in one and the same memory plane as a conventional EPROM cell and can be selected by using the same decoders and control circuits, as will be explained in greater detail below.

Thus, according to one embodiment of the present invention, the first memory zone Z2, designed to record the error bits, consists of an EPROM type memory zone, the memory cells of which are made up of floating gate transistors 1, as shown in the FIGS. 2 and 3. Each floating gate transistor 1 comprises two main electrodes, 2 and 3 respectively, and a control gate 5 stacked on the floating gate 4. In the case of an N-channel MOS transistor, as shown in the FIGS. 3A and 3B, the electrodes 2 and 3 comprise N+ diffusions in a P type substrate. The floating gate 5 and the control gate 4 are made of polycrystalline silicon, for example, while the insulating material I is made of silicon dioxide Si02. One of the main electrodes, mainly the electrode 2 in the embodiment shown, is grounded while the electrode 3 is connected by a bit line (not shown) and a MOS transistor, forming a switch 8, to a column address decoder 7. The command gate 5 is connected by means of another connection, called a word line (not shown), to a lines address decoder 6. The bit lines and word lines are arranged in rows and columns to determine a matrix including the memory cell 1 in a manner known to the specialist. In fact, the column address decoder 7 is connected to the transistor gate 8, which has one of its main electrodes connected to the electrode 3 of the transistor 1 while its other main electrode is connected by a circuit, comprising MOS transistors 11 and 12, to the bias voltage Vpp. More specifically, the MOS transistor 11 is a depleted transistor, with one of its electrodes connected to the voltage Vpp while the other electrode is connected to one of the electrodes of the MOS transistor 12 which is an enhancement transistor. The two transistor gates 11 and 12 are together connected to a programming control ciruit 10. The other electrode of the transistor 12 is therefore connected to one of the electrodes of the MOS transistor 8 forming a switch, the middle point between the transistors 12 and 8 being connected to a reading amplifier 9.

To programme a memory cell of the type depicted in FIG. 2 at "1", a programming voltage equal to Vpp is applied to its control gate 5, by selecting the said memory cell 1 through decoders 6 and 7. In this case, the transistors 8, 11 and 12 correspond to a load resistance and the drain voltage VD is equal to VPP -Vcharge while the gate voltage Vgp is equal to Vpp.

With reference to FIGS. 4 and 5, we shall now describe a simulation cell according to the present invention. In the embodiment shown, the simulation cell is part of the EPROM memory field M. However, it is obvious to the specialist that this simulation cell can be made and controlled in an independent way, directly from the identifying comparator. As shown in the FIGS. 4A and 4B, the simulation cell consists of a floating gate MOS transistor 20, which has its floating gate 21 connected to the control gate 22. In the embodishown, this simulation cell 20 is connected to a row address decoder 6' and to the same column address decoder circuit 7 and the same programming control circuit 10 as the memory cell of FIG. 2. In fact, the simulation cell 20 can be connected to the same row address decoder circuit 6 as the memory cell of the FIG. 2, if the signal Vpp and the signal Vref (used to obtain the same programming current) can be cotroled on the decoders themselves. In the embodiment shown, it has been chosen, for lower consumption, to use two different row address decoders 6, 6', one receiving Vpp and the other receiving Vref., but the row selected is the same, i.e. the two decoders decode the same memory address.

According to the present invention, to avoid fraud, the simulation cell must behave, during programming, in the same way as the memory cell 1. To do this, there should therefore be the same straight-line load curve, i.e. the same drain-source voltage Vds and the same gate-source voltage Vgs.

In the embodiment shown, Vds=Vpp-Vcharge and is identical in both cases.

Furthermore, Vgs=$\gamma$Vg p.

Consequently, the same gate-source voltage is obtained in a simulation cell as in a normal cell, by using the factor $\gamma$. For, when a memory cell is programmed, the floating gate is loaded and, consequently, on the control gate, there is a capacitive ratio due to this load. Thus, for example, if Vpp=22 volts on the control gate, there is a voltage of 22 volts x$\gamma$ on the floating gate. Hence, according to the present invention, instead of applying Vpp to the control gate/floating gate unit of the simulation cell 20, a voltage Vref. will be applied, equal to $\gamma$Vpp.

According to the present invention, this voltage Vref. can be obtained from the voltage Vpp, by using a voltage subtracting circuit. This voltage subtracting circuit comprises the depleted MOS transistor 30, a cascade connection of 5 MOS transistors 31, 32, 33, 34 and 35, each connected as a diode, and a depleted MOS transistor 36.

More specifically, a first main electrode of the transistor 30 is connected to the voltage source Vpp and its second main electrode is connected to a point 37 at the first electrode of the transistor 31. The gates of transistors 30 and 31 are connected together and are connected to the point 37. The second main electrode of the transistor 31 is linked to the first main electrode of the transistor 32. The depleted transistor 30 has in fact two roles. Its first role is to protect the transistors 31 to 36 with respect to the voltage Vpp, for it has greater capacity to withstand voltages in the range of Vpp, namely 20 volts. Its second role is to monitor the current in the line of transistors and, consequently, the value of Vref.

In the cacade connection of the transistors 31, 32, 33 and 35, the control gates of each of these transistors are connected to their drains. Each transistor thus forms a diode and causes a calibrated drop in potential VT. Furthermore, the second electrode of the transistor 35 is connected to the first main electrode of the depleted transistor 36, the second main electrode and the gate of which are connected to Vss. The transistor 36 is thus still conductive. It channels the current Vpp towards Vss and provides for greater stability of the voltage Vref. Vref. is a reference voltage and absorbs little current.

With the above assembly, therefore, the reference voltage Vref. =Vpp-5 VT is obtained at the point 38, VT being chosen such that 5VT=$\gamma$ This circuit was made in a specific case for which:
Vpp=22 V
$\gamma$=0.7
VT=$V_{TO}$+$K_B\phi_T$=1.2 V ($K_B$ being the substrate effect rate).

In the technology chosen the transistors have a $V_{TO}$ of 0.9 V, but when their source is at a potential of more than Vss, a substrate effect is added and a $V_T$ of 1.2 V is then obtained.

It is clear to the specialist that other circuits can be envisaged to obtain the reference voltage, such as voltage raising circuits or charge pump circuits or again, more complex circuits with transistors of a special threshold voltage with memory cells or other elements.

What is claimed is:

1. An integrated circiut for the confidential storage and processing of data, comprising:
    an electrically programmable non-volatile memory contianing, at least authorization data,
    input/output means used to couple said circuit to eternal circuitry,
    processing means connected getween the input/output means and the non-volatile memory, said processing means comprising a comparator for comparing the authorization data with a confidential code on an accesskey introduced through the input/output means, means for writing in a non-volatile memory zone an error bit whenever the comparator indicates that the confidential code or access key is wrong,
    said integrated circuit further comprising a simulation cell circuit, which is activated when the comparator indicates that the confidential code or accesskey is right and which then, without memorizing any information, draws an electrical current substantially identical to the current drawn by the writing of an error bit in said non-volatile memory zone.

2. Integrated circuit according to claim 1 wherein, when the first memory zone comprises a non-volatile memory, the memory cells of which are formed of floating gate transistors, the simulations cell consists of a flating gate transistor, the floating gate of which is short-circuited with the control gate, this floating gate exhibiting the same gate-source voltage as a memory cell of the first memory zone.

3. Integrated circuit according to the claim 2, wherein the gate-source voltage of the simulation cell is obtained by applying, to the control gate of the simulation cell, a write control voltage equal to $\gamma$ x the write control voltage applied to the memory cells of the first memory zone, $\gamma$ being the coupling coefficient of a floating gate transistor.

* * * * *